United States Patent
Kuriya et al.

(10) Patent No.: US 9,523,854 B2
(45) Date of Patent: Dec. 20, 2016

(54) HEAD-MOUNTED DISPLAY, PROGRAM FOR CONTROLLING HEAD-MOUNTED DISPLAY, AND METHOD OF CONTROLLING HEAD-MOUNTED DISPLAY

(71) Applicant: Sony Corporation, Tokyo (JP)

(72) Inventors: Shinobu Kuriya, Kanagawa (JP); Masatoshi Ueno, Kanagawa (JP); Kenichi Kabasawa, Saitama (JP); Daisuke Kawakami, Kanagawa (JP); Tetsuro Goto, Tokyo (JP); Hisako Sugano, Kanagawa (JP); Tsubasa Tsukahara, Tokyo (JP); Toshiyuki Nakagawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 125 days.

(21) Appl. No.: 14/376,026

(22) PCT Filed: Feb. 1, 2013

(86) PCT No.: PCT/JP2013/000557
§ 371 (c)(1),
(2) Date: Jul. 31, 2014

(87) PCT Pub. No.: WO2013/121730
PCT Pub. Date: Aug. 22, 2013

(65) Prior Publication Data
US 2015/0009132 A1    Jan. 8, 2015

(30) Foreign Application Priority Data
Feb. 17, 2012 (JP) .................................. 2012-032647

(51) Int. Cl.
G09G 5/00 (2006.01)
G02B 27/01 (2006.01)
G06F 3/01 (2006.01)

(52) U.S. Cl.
CPC ............. *G02B 27/017* (2013.01); *G06F 3/012* (2013.01); *G06F 3/013* (2013.01);
(Continued)

(58) Field of Classification Search
CPC .......... G06F 3/012; G06F 3/013; G02B 27/01; G02B 27/017; G02B 2027/0123; G02B 2027/0178; G02B 2027/0187
(Continued)

(56) References Cited

U.S. PATENT DOCUMENTS 6,152,563 A * 11/2000 Hutchinson ............ A61B 3/113
351/209
6,184,847 B1 * 2/2001 Fateh ...................... G06F 3/011
345/8
(Continued)

FOREIGN PATENT DOCUMENTS

JP    HEI 06-078248    3/1994

OTHER PUBLICATIONS

International Search report issued in connection with International Application No. PCT/JP2013/000557, dated Apr. 25, 2013. (3 pages).

*Primary Examiner* — Jonathan Boyd
(74) *Attorney, Agent, or Firm* — K&L Gates LLP

(57) ABSTRACT

A head-mounted display comprising a display and a detector. The detector is configured to detect a direction of at least one of the head-mounted display and a line of vision. The display is configured to display an output image of an application, wherein the application is selected based on the direction being outside a range of a front direction.

20 Claims, 9 Drawing Sheets

(52) U.S. Cl.
CPC ............... *G02B 2027/0123* (2013.01); *G02B 2027/0178* (2013.01); *G02B 2027/0187* (2013.01)

(58) Field of Classification Search
USPC ............................................................ 345/8
See application file for complete search history.

(56) References Cited

U.S. PATENT DOCUMENTS

2007/0052672 A1    3/2007  Ritter et al.
2011/0221656 A1    9/2011  Haddick et al.

\* cited by examiner

FIG.4
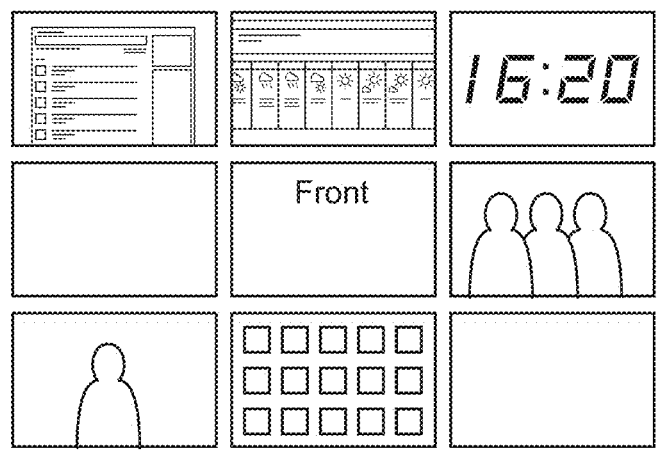
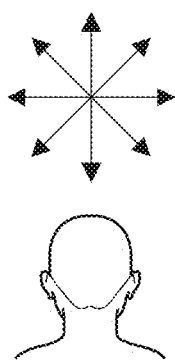

HEAD-MOUNTED DISPLAY, PROGRAM FOR CONTROLLING HEAD-MOUNTED DISPLAY, AND METHOD OF CONTROLLING HEAD-MOUNTED DISPLAY

CROSS REFERENCES TO RELATED APPLICATIONS

The present application is a national stage of International Application No. PCT/JP2013/000557 filed on Feb. 1, 2013 and claims priority to Japanese Patent Application No. 2012-032647 filed on Feb. 17, 2012, the disclosure of which is incorporated herein by reference.

BACKGROUND

The present disclosure relates to a head-mounted display that switches and displays an output image of an application, a program for controlling the head-mounted display, and a method of controlling the head-mounted display.

A known head-mounted display (hereinafter referred to as HMD) is mounted on the head of the user and displays an image on a display unit arranged in front of the eyes of the user. The HMD includes a non-see-through HMD that does not allow outside light to pass through a display unit and allows only a display image to be visually recognized by the user and a see-through HMD that allows outside light to pass through a display unit and allows a display image to be superimposed on a field of vision of the user. For example, PTL 1 below discloses a "visual apparatus" as the non-see-through HMD.

CITATION LIST

Patent Literature

[PTL 1]
Japanese Patent Application Laid-open No. HEI 06-78248

SUMMARY

Technical Problem

In general, an HMD such as the one described in PTL 1 above can be operated by a controller. However, a person wearing an HMD has a limited field of vision in many cases, and an operation of the HMD by the controller causes a problem in usability.

In view of the above circumstances, it is desirable to provide a head-mounted display excellent in usability, a program for controlling the head-mounted display, and a method of controlling the head-mounted display.

Solution to Problem

A head-mounted display comprising a display and a detector. The detector is configured to detect a direction of at least one of the head-mounted display and a line of vision. The display is configured to display an output image of an application, wherein the application is selected based on the direction being outside a range of a front direction.

Effect

As described above, according to the embodiments of the present disclosure, it is possible to provide a head-mounted display excellent in usability, a program for controlling the head-mounted display, and a method of controlling the head-mounted display.

Additional features and advantages are described herein, and will be apparent from the following Detailed Description and the figures.

BRIEF DESCRIPTION OF THE FIGURES

FIG. 4 is a schematic view showing directions of the head-mounted display and examples of output images of displayed applications.

DETAILED DESCRIPTION

First Embodiment

A head-mounted display (hereinafter referred to as MID) according to a first embodiment will be described.
[Configuration of Head-Mounted Display]

Figure 1:
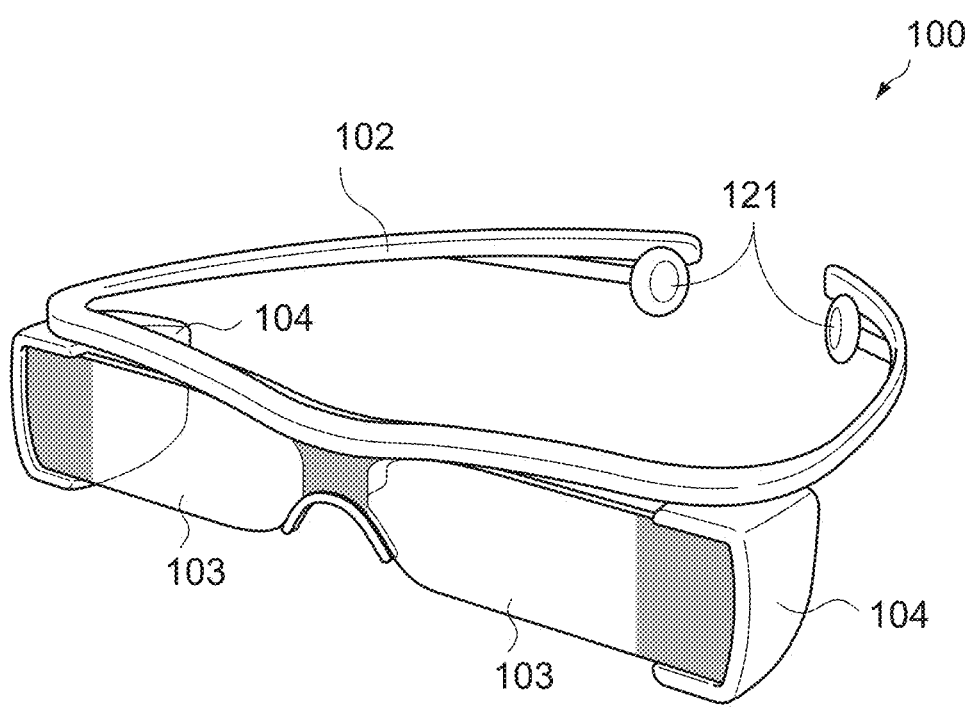
FIG. 1 is a schematic view showing the appearance of a head-mounted display according to a first embodiment of the present disclosure.
Figure 2:
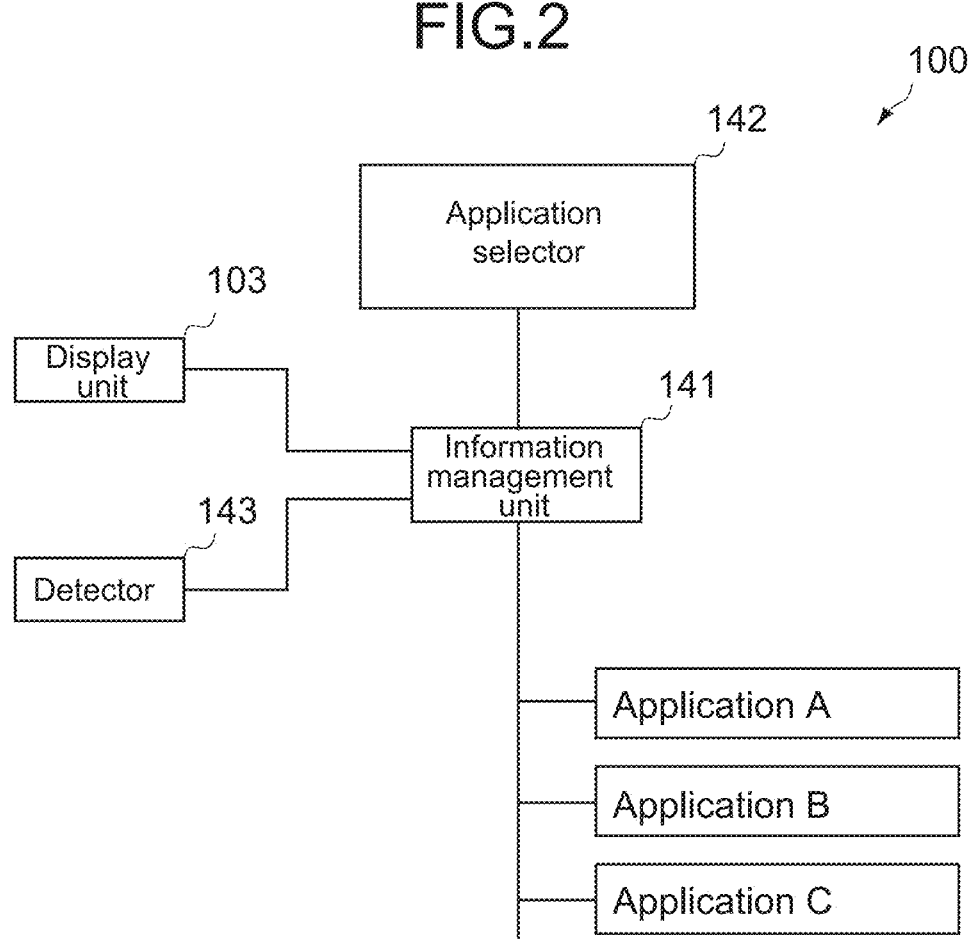
FIG. 2 is a block diagram showing the functional configuration of the head-mounted display.

FIG. 1 is a schematic view showing the appearance of an HMD 100, and FIG. 2 is a block diagram showing the functional configuration of the HMD 100.

As shown in FIG. 1, the HMD 100 has a mounting member 102, a display unit 103, and a housing 104. The display unit 103 and the housing 104 are supported by the mounting member 102. Further, the mounting member 102 is equipped with earphones 121. As shown in FIG. 2, the housing 104 accommodates an information management unit 141, an application selector 142, and a detector 143 therein.

The mounting member 102 is mounted on the head of the user and supports the display unit 103 in front of the eyes of the user. The mounting member 102 is not particularly limited in shape and can be formed into any shape other than a glass shape shown in FIG. 1 so long as it is capable of supporting the display unit 103.

The display unit 103 can be a display capable of displaying an image in front of the eyes of the user and be a see-through display allowing outside light to pass through. Examples of the see-through display include a video see-through type that displays a surrounding image captured by a camera thereon to allow visual recognition of surroundings and include an optical see-through type that has light transmissivity per se. In this embodiment, any type of these see-through displays may be used.

The display unit 103 is connected to the information management unit 141 accommodated in the housing 104 and capable of displaying an image generated by the information management unit 141 thereon. A detailed description of an image displayed on the display unit 103 will be given later.

The housing 104 accommodates the information management unit 141, the application selector 142, and the detector 143 therein. The information management unit 141 and the application selector 142 are realized by the cooperation between hardware such as a processor and a memory and a program. As will be described in detail later, the application selector 142 selects an application based on an output from the detector 143, and the information management unit 141 displays an image generated by a selected application on the display unit 103.

The detector 143 detects its direction (i.e., direction of the HMD 100) and supplies an output of the detection to the application selector 142 via the information management unit 141. A transition of a direction of the HMD 100 takes place when the user wearing the HMD 100 changes a direction of the head or the body. Specifically, the detector 143 can be a motion sensor constituted of an acceleration sensor, a gyrosensor, and a magnetic field sensor. In addition, the detector 143 is not limited to a motion sensor but can be a sensor capable of detecting a direction of the HMD 100, e.g., a sensor that detects a direction of the HMD 100 by performing image processing on a surrounding image captured by a camera.

Note that in this embodiment, the information management unit 141, the application selector 142, and the detector 143 are accommodated in the housing 104. However, they are not necessarily accommodated in the housing 104. For example, the information management unit 141 and the application selector 142 may be incorporated in another information processing apparatus (such as personal computer (PC) and smart phone) and connected to the detector 143 and the display unit 103 in a wired or wireless manner.

[Operations of Head-Mounted Display]

Figure 3:
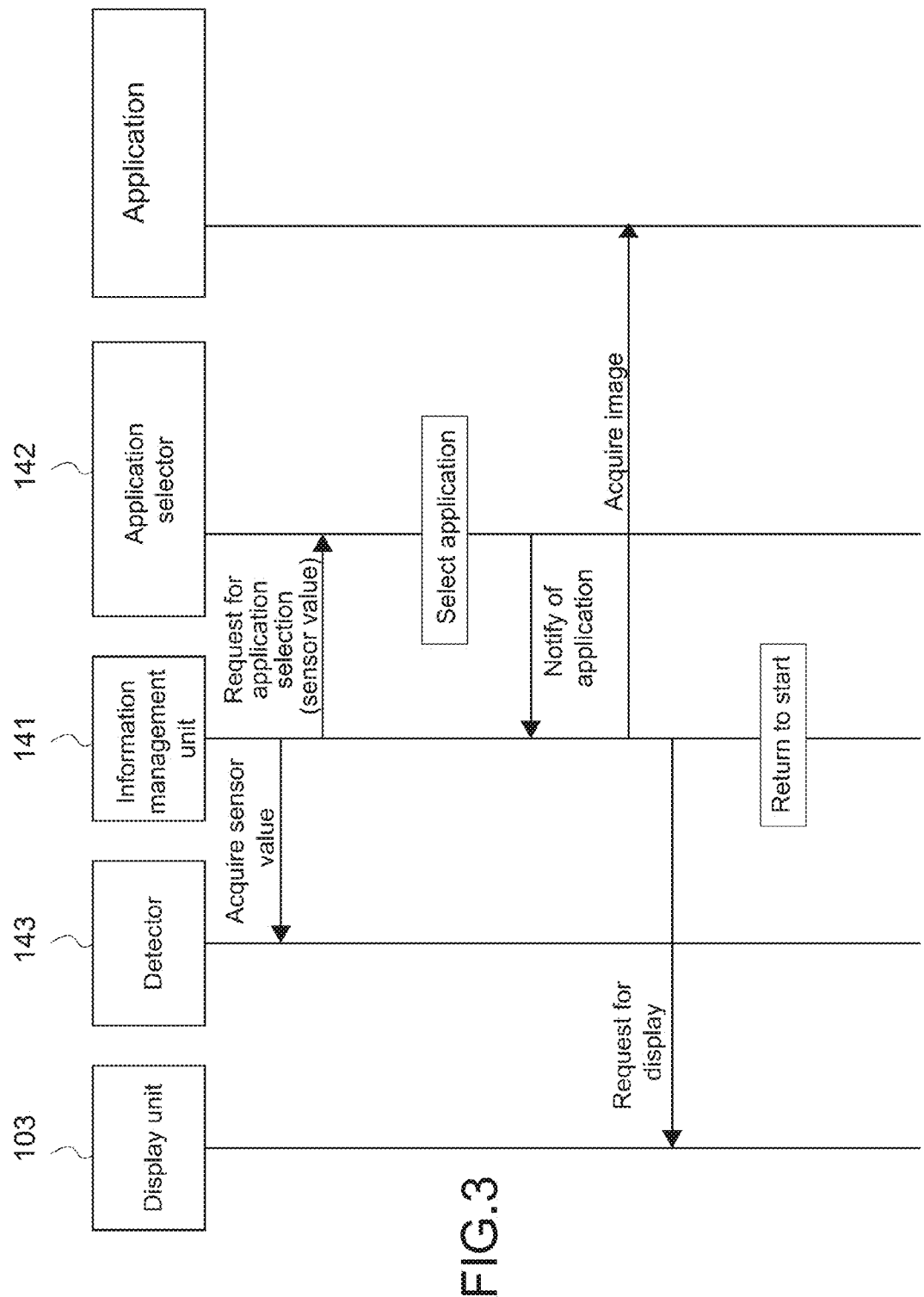
FIG. 3 is a sequence diagram showing operations of the head-mounted display.

Operations of the MID 100 thus configured will be described. FIG. 3 is a sequence diagram showing the operations of the HMD 100.

It is now assumed that an output image of an application A is displayed on the display unit 103 in a state where the user wears the HMD 100. If the display unit 103 is a see-through display, the user may be in a state of seeing an outside through the display unit 103 because no image is displayed on the display unit 103. A direction of the HMD 100 at this time is defined as a "front direction."

The information management unit 141 acquires a sensor value indicating a direction of the HMD 100 from the detector 143 every predetermined time. Then, the information management unit 141 supplies the sensor value to the application selector 142.

The application selector 142 selects an application based on the sensor value. Specifically, if the sensor value is included in the range of values indicating the "front direction," the application selector 142 selects the application A as it is. On the other hand, if the sensor value is not included in the range of the values indicating the "front direction" (i.e., "non-front direction"), the application selector 142 can select another application (application B).

Next, the application selector 142 notifies the information management unit 141 of the application B thus selected. Then, the information management unit 141 acquires a display image from the notified application B and displays the acquired display image on the display unit 103.

From the viewpoint of the user, the above operations are performed as follows. That is, when the user wears the HMD 100 and turns on power or performs a predetermined input operation, a direction of the HMD 100 is defined as the "front direction." At this time, the output image of the application A is displayed on the display unit 103.

When the user turns the head in any direction, a transition of the direction of the HMD 100 also takes place. At this time, if the direction of the HMD 100 exceeds the range of the front direction, the output image of the application B is displayed on the display unit 103 instead of the output image of the application A. For example, in a state where a moving-image reproduction application is set as the application A and a time display application is set as the application B, the user can confirm a time by changing a direction of the head and directing the HMD 100 in the non-front direction during reproduction of a moving image. When the user restores the head in the front direction, the output image of the application A is displayed on the display unit 103 again.

In addition, if the display unit 103 is a see-through display, no image (including the output image of the application A) may be displayed on the display unit 103 of the HMD 100. In this case, the user is in a state of seeing an outside through the display unit 103, and then the user can visually recognize the output image of the application B by changing the direction of the HMD 100.

Examples of the application (application B) whose output image can be visually recognized by changing the direction of the HMD 100 include the following applications. That is, such applications include those for displaying weather, a clock, a one-sentence news, a stock price, a foreign exchange, a schedule, a calendar, a photo frame, an auction price, a frequently searched word, a map and information for a current location, etc.

In the above description, the output image of the application B is displayed on the display unit 103 when the transition of the direction of the MID 100 takes place from the front direction to the non-front direction. However, an output image of a different application may also be displayed on the display unit 103 for each of transition directions of the HMD 100 to another non-front direction. FIG. 4 is a schematic view showing directions of the HMD 100 and examples of output images of displayed applications.

The application selector 142 can select a different application for each of the transition directions of the HMD 100. For example, the application selector 142 can select the application B when the HMD 100 is directed from the front direction to a right-hand direction, select an application C when the HMD 100 is directed from the front direction to a left-hand direction, and select an application D when the HMD 100 is directed from the front direction to an upper direction. Thus, the user can see output images of different applications by directing the head in various directions.

Figure 5:
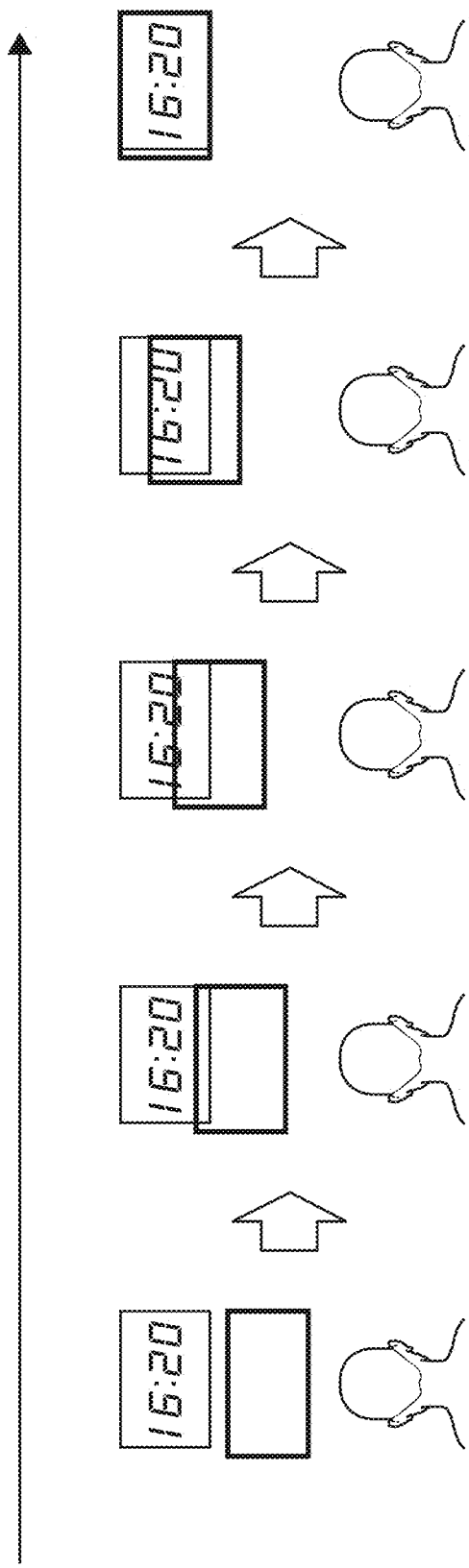
FIG. 5 is a schematic view showing directions of the head-mounted display and an output image of an application displayed in a sliding manner.

In addition, in the above description, the output image of the application B or the like is displayed on the display unit 103 if the direction of the MID 100 exceeds the range of the front direction. However, an effect may be produced at this time. FIG. 5 is a schematic view showing directions of the HMD 100 and an example of an image displayed on the display unit 103.

When the application B is selected by the application selector 142, the information management unit 141 can display the output image of the application B from the outside of a screen in a sliding manner depending on a degree of the direction of the HMD 100. Thus, the output image of the application B is gradually displayed depending on a turning degree of the head of the user, and the user can feel as if he/she were naturally accessing the information.

Similarly, when the HMD 100 is restored in the front direction, the information management unit 141 can display the output image of the application B outside of the screen in a sliding manner. In addition, once the direction of the HMD 100 exceeds the range of the front direction, the information management unit 141 may display the output image of the application B from the outside of the screen in a sliding manner regardless of a degree of the direction of the HMD 100.

Figure 6:
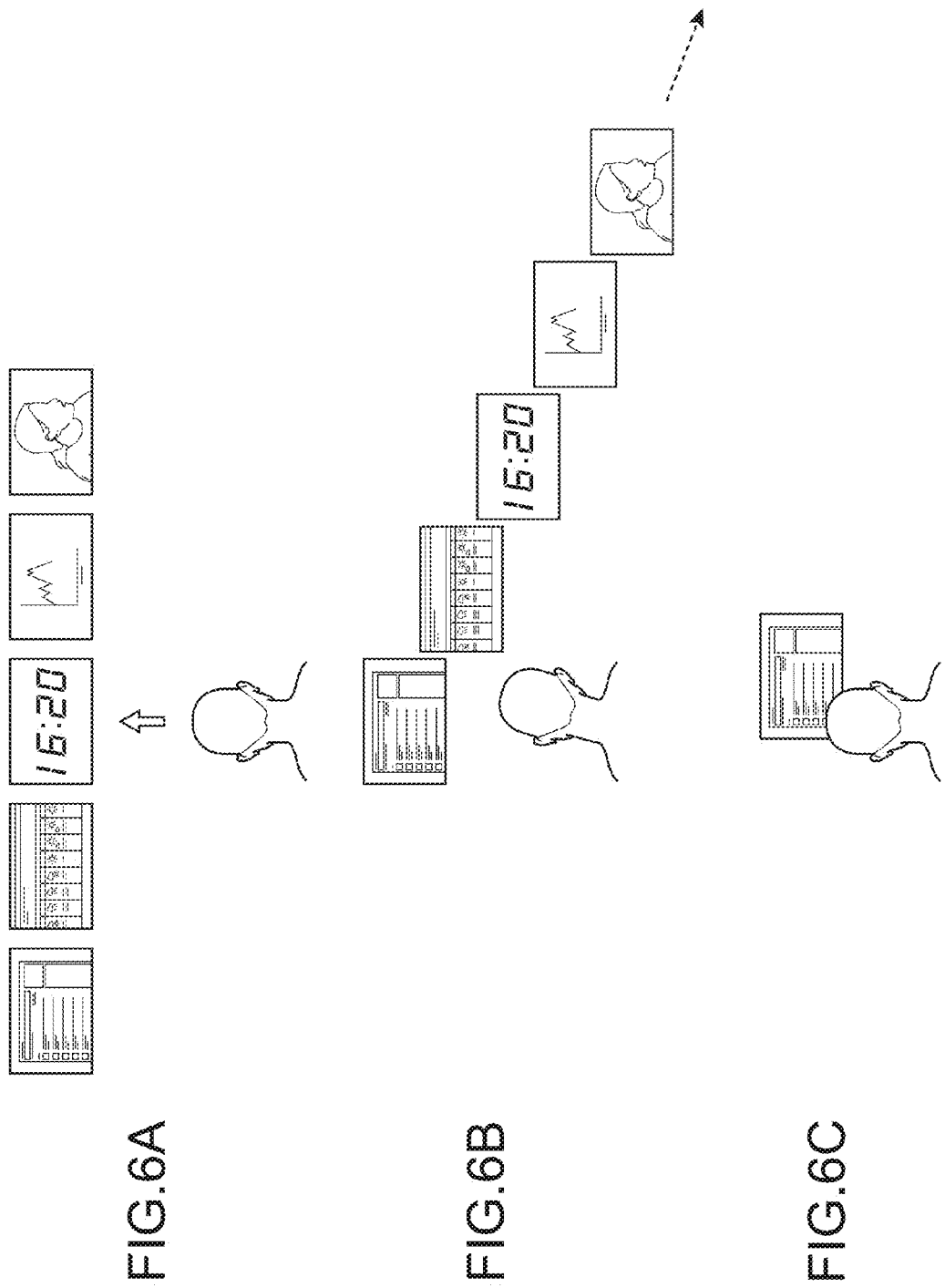
FIGS. 6A to 6C are schematic views showing applications displayed in menu form in the head-mounted display.

Moreover, in the above description, an application to be displayed on the display unit 103 is selected depending on a direction of the HMD 100. However, the user may select an application from a menu. FIGS. 6A to 6C are schematic views showing an example of selecting an application from a menu.

When the HMD 100 is directed from the front direction to a predetermined direction (e.g., upper direction) as shown in FIG. 6A, a plurality of applications are displayed (displayed in menu form) side by side on the display unit 103. When the user tilts the head to incline the HMD 100, the applications displayed in menu form are displayed in a sliding manner as shown in FIG. 6B. The user can intuitively select one of the applications with a feeling as if a menu were slid with gravity. Alternatively, when the HMD 100 is directed in a predetermined direction (e.g., right-hand direction), the applications may be displayed in a sliding manner. When the user restores the head to direct the HMD 100 in the front direction, one of the applications is selected as shown in FIG. 6C.

As described above, according to this embodiment, the user can switch an application to be displayed on the display unit 103 by turning the head and changing a direction of the HMD 100. Therefore, it can be said that the HMD 100 is excellent in usability.

Second Embodiment

A head-mounted display (HMD) according to a second embodiment will be described. In this embodiment, the same configurations as those of the first embodiment will be denoted by the same signs, and descriptions thereof will be omitted.

[Configuration of Head-Mounted Display]

Figure 7:
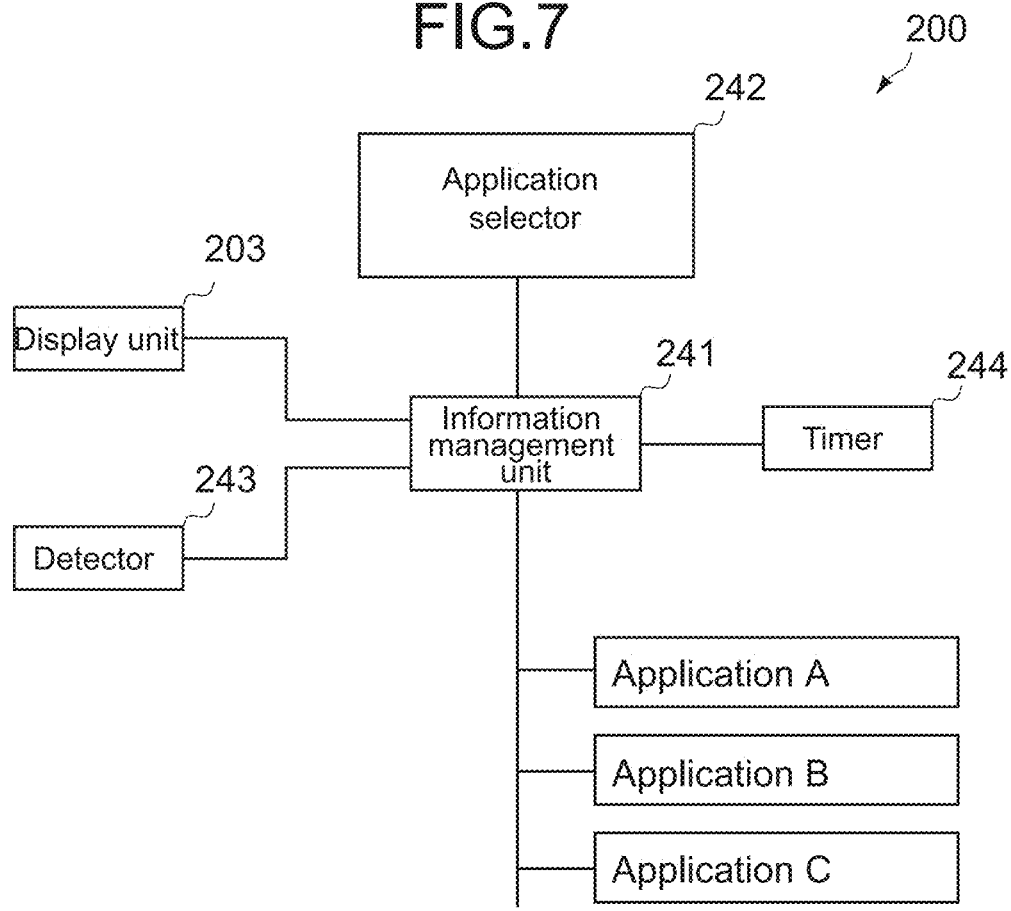
FIG. 7 is a block diagram showing the functional configuration of a head-mounted display according to a second embodiment of the present disclosure.

FIG. 7 is a block diagram showing the functional configuration of an MID 200 according to the second embodiment. Note that the HMD 200 can have the same appearance as that of the HMD 100 according to the first embodiment.

The HMD 200 has a timer 244 besides an information management unit 241, an application selector 242, and a detector 243. The timer 244 is connected to the information management unit 241. Upon receiving a request from the information management unit 241, the timer 244 starts counting a time and returns a timer value to the information management unit 241.

In the above first embodiment, the application selector 142 selects an application based on a sensor value output from the detector 143. In this embodiment, however, the application selector 242 selects an application based on a timer value output from the timer 244 besides a sensor value.

The information management unit 241, the application selector 242, and the timer 244 may be accommodated in a housing as in the first embodiment or may be incorporated in another information processing apparatus (such as PC and smart phone) and connected to the detector 243 and a display unit 203 in a wired or wireless manner.

[Operations of Head-Mounted Display]

Figure 8:
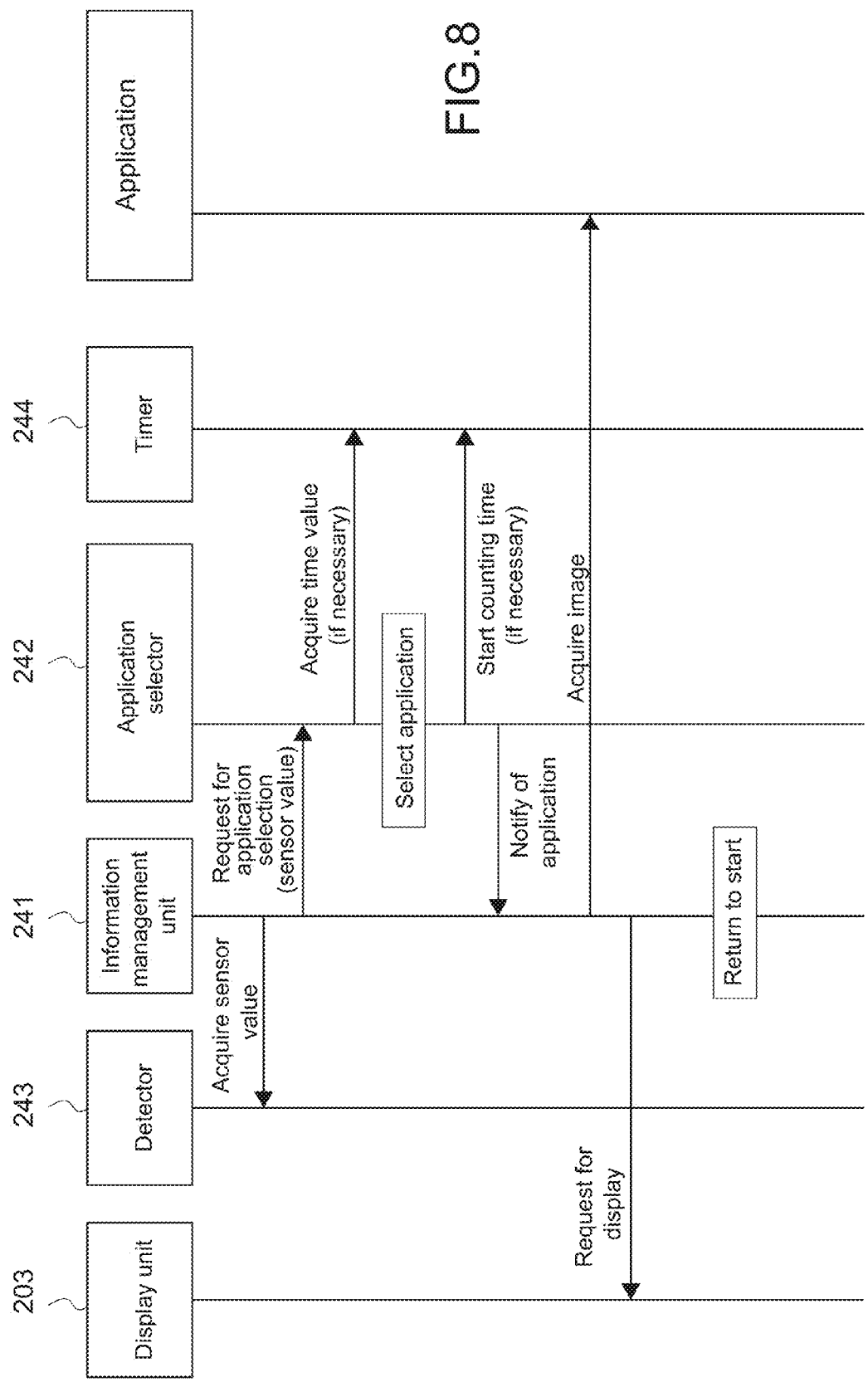
FIG. 8 is a sequence diagram showing operations of the head-mounted display.

Operations of the HMD 200 thus configured will be described. FIG. 8 is a sequence diagram showing the operations of the HMD 200.

It is now assumed that an output image of an application A is displayed on the display unit 203 in a state where the user wears the HMD 200. If the display unit 203 is a see-through display, the user may be in a state of seeing an outside through the display unit 203 because no image is displayed on the display unit 203. A direction of the HMD 200 at this time is defined as a "front direction."

The information management unit 241 acquires a sensor value indicating a direction of the HMD 200 from the detector 243 every predetermined time. Then, the information management unit 241 supplies the sensor value to the application selector 242. In addition, the application selector 242 acquires a timer value from the timer 244.

The application selector 242 selects an application based on the sensor value and the timer value. Specifically, if the sensor value is not included in the range of values indicating the "front direction" ("non-front direction"), the application selector 242 selects another application (application B). On the other hand, if the sensor value is included in the range of the values indicating the "front direction," the application selector 242 refers to the timer value. Then, the application selector 242 selects the application B if the timer value exceeds a predetermined time or selects the application A if the timer value is less than or equal to the predetermined time.

Simultaneously with the selection of the application, the application selector 242 instructs the timer 244 to start counting a time. The timer value that the application selector 242 acquires from the timer 244 is a time started to be counted at this time. That is, if the application B is selected over the predetermined time, the application selector 242 selects the application B even if the sensor value is included in the range of the values indicating the "front direction."

In other words, if the HMD 200 is directed in the non-front direction and a time during which the application B is selected by the application selector 242 continues for the predetermined time, the application B is selected (fixed) instead of the application A even if the HMD 200 is restored in the front direction. This is because, if the predetermined time elapses in a state where the HMD 200 is directed in the non-front direction, it can be determined that the user is carefully seeing an output image of the application B.

On the other hand, if the HMD 200 is directed in the front direction and the predetermined time elapses in a state where the application B is fixed, fixation of the application B is released and the original application A is selected.

Next, the application selector 242 notifies the information management unit 241 of the application B thus selected. Then, the information management unit 241 acquires a display image from the notified application B and displays the acquired display image on the display unit 203.

Figure 9:
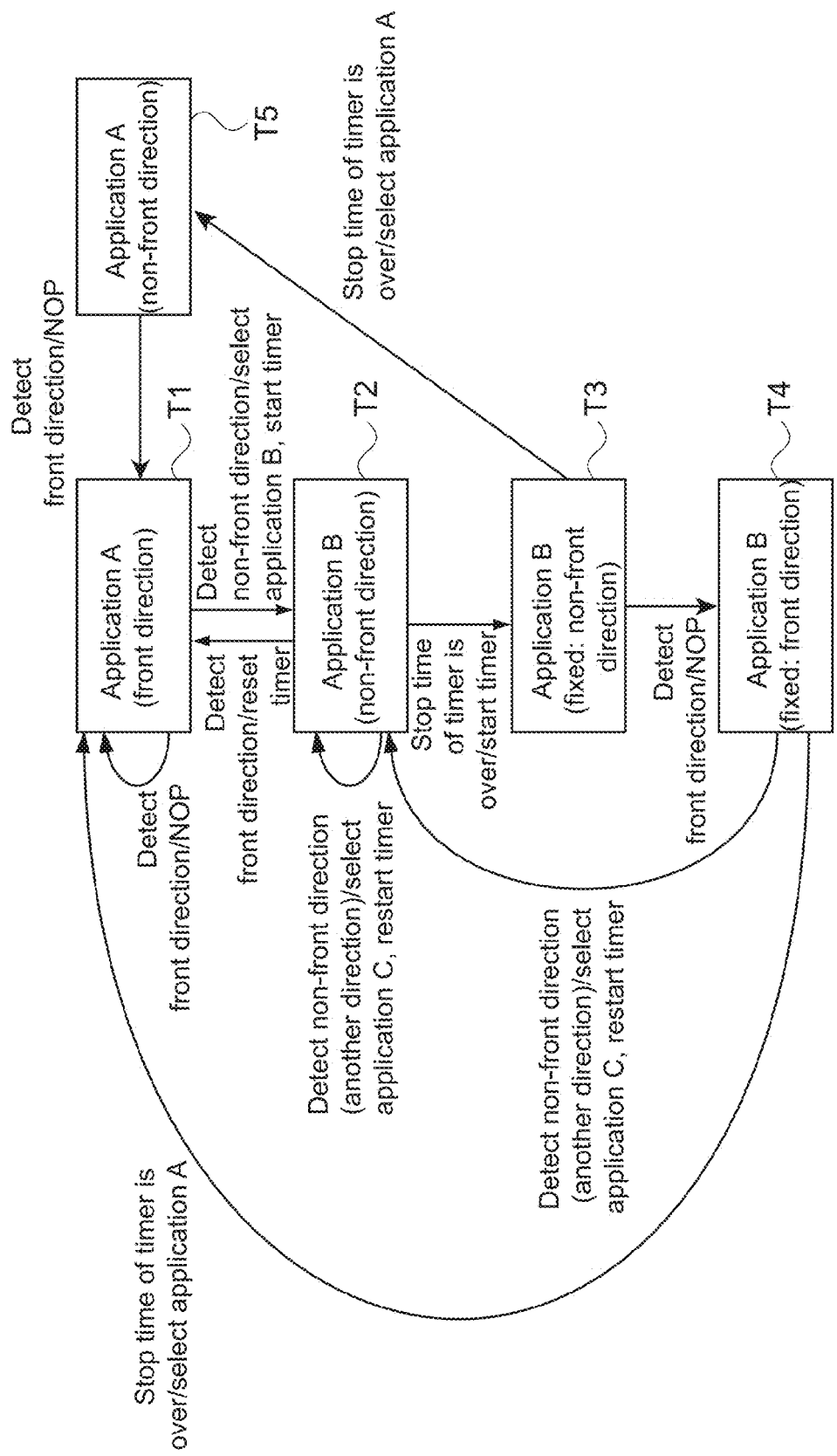
FIG. 9 is a schematic view showing transitions of applications to be displayed on the head-mounted display.

From the viewpoint of the user, the above operations are performed as follows. FIG. 9 is a schematic view showing transitions of applications to be displayed on the display unit 203. When the user wears the HMD 200 and turns on power or performs a predetermined input operation, a direction of the HMD 200 is defined as the "front direction." At this time, the output image of the application A is displayed on the display unit 203 (T1). If the user keeps the head in the front direction, the output image of the application A is continuously displayed (T1→T1).

When the user turns the head in any direction, a transition of the direction of the HMD 200 also takes place. At this time, if the direction of the HMD 200 exceeds the range of the front direction ("non-front direction"), the output image of the application B is displayed on the display unit 203 instead of the output image of the application A (T1→T2). If the HMD 200 is restored in the front direction before a predetermined time elapses, the display image of the application A is displayed again (T2→T1).

Here, if the user directs the HMD 200 in the non-front direction over the predetermined time (stop time of the timer), the application B is fixed as described above (T2→T3). If the predetermined time (stop time of the timer) elapses in this state, the output image of the application A is displayed on the display unit 203 instead of the output image of the application B (T3→T5). On the other hand, if the HMD 200 is directed in the front direction before the predetermined time elapses, the output image of the application B is continuously displayed on the display unit 203 because the application B is fixed (T3→T4).

If the predetermined time (stop time of the timer) elapses in a state where the HMD 200 is directed in the front direction, the fixation of the application B is released and the output image of the application A is displayed on the display unit 203 again (T4→T1). Then, when the HMD 200 is directed in another non-front direction as in the first embodiment, an output image of another application (application C or the like) is displayed on the display unit 203 (T2→T2, T4→T2).

Examples of the application (application B) whose output image can be visually recognized by changing the direction of the HMD 200 include the same applications as those of the first embodiment. That is, such applications include those for displaying weather, a clock, a one-sentence news, a stock price, a foreign exchange, a schedule, a calendar, a photo frame, an auction price, a most frequently searched word, a map and information for a current location, etc.

In this embodiment, if the predetermined time elapses in a state where the HMD 200 is directed in the non-front direction, an application being displayed is fixed. Accordingly, this embodiment is excellent in usability if the user wishes to carefully see an output image of the application. Note that as in the first embodiment, selection of applications displayed in menu form, a slide effect, or the like may also be applied to this embodiment.

(Modifications)

In the above first and second embodiments, the selection of an application is performed based on a direction of the HMD. However, information on a line of vision of the user may also be used. Specifically, the application selector can use a line of vision of the user as a gesture at the fixation and the release of an application described above. Thus, it becomes possible to easily reflect an intension of the user on the selection of an application. Recognition of a line of vision of the user can be made by performing, for example, image processing on an image of the eyeballs of the user captured by a camera provided in the HMD.

In addition, position information on the HMD may also be used for the selection of an application. Specifically, when detecting that the HMD is moving at a constant speed or faster (i.e., the user is moving), the application selector stops selecting an application and can display no image on the display unit. Thus, it becomes possible to prevent the user from being put in danger during movement. Position information may be acquired from, for example, an output of a GPS (Global Positioning System) and an acceleration sensor provided in the HMD.

In the above second embodiment, the fixation and the release of an application are determined by a stop time counted by the timer. However, a stop time of the timer may be determined depending on a transition speed of a direction of the HMD. In addition, a stop time of the timer may be different for each application.

Moreover, the fixation and the release of an application may be performed by an input operation unit (such as button and touch sensor) provided in the HMD. Furthermore, the fixation and the release of an application may also be performed by a gesture made when the user moves the head. Specifically, for example, an application is fixed when the user nods the head, fixed when the user further turns up the head, fixed when the user tilts the head, released when the user quickly shakes the head, not released when the user slowly shakes the head, and released when the user moves the head in a state where the head is fixed in the front direction.

Furthermore, the fixation and the release may be performed based on information on a line of vision of the user. That is, the fixation and the release are performed by a gesture based on a line of vision of the user or the like. For example, an application is fixed or released when the user closes the eyes for a while, fixed when the user returns the head with the eyes closed, fixed when the user adjusts the focus of the eyes, and released when the user takes the eyes out of focus.

Furthermore, the fixation or the release may be performed by a physical action of the user such as flicking off with the hand, biting, stamping, and jumping. Furthermore, the fixation or the release may be performed depending on outside circumstances. For example, an application is released when an automobile or a person turns up in front of the user.

(Applications)

Applications of the HMD according to the embodiments of the present disclosure will be described.

[Dictionary]

When the HMD is directed in the front direction in a state where the user wearing the HMD reads a sentence of a document or the like, no image is displayed on the display unit (see-through display). However, a camera provided in the HMD performs character recognition to extract words in the sentence. When the HMD is directed in the non-front direction, output results (such as meanings and translations of the words) of a dictionary application are displayed on the display unit. Words at positions carefully seen by the user may be extracted in combination with a line of vision of the user.

[Subtitles]

When the HMD is directed in the front direction, a moving image such as a movie is displayed on the display unit. Then, when the HMD is directed in the non-front direction, subtitles corresponding to a reproduced scene of the moving image are displayed. Note that when the HMD is directed in the front direction, no image may be displayed on the display unit (see-through display) such that the user watches an actual moving image through the display unit. In this case, subtitles are acquired by image recognition or via a network.

[Learning]

When the HMD is directed in the front direction, a "question" is displayed on the display unit. Then, when the HMD is directed in the non-front direction, an answer to the question or a hint for the question is displayed on the display unit. For example, it is possible to display the hint for the question when the HMD is directed from the front direction to the upper direction and display the answer to the question when the HMD is directed from the front direction to the lower direction.

[Notification]

When the HMD is directed in the front direction, no image is displayed on the display unit or an output image of any application is displayed thereon. With reception of an electronic mail (e-mail) or a social networking service (SNS), notification of the reception is displayed on the display unit. When the user directs the HMD in the non-front direction, a message of the E-mail or the SNS is displayed on the display unit. The message may be displayed only at the end of the display unit rather than being displayed on the entirety of the display unit. Further, when no new message is arrived, no change may be made in the display of the display unit even if the HMD is directed in the non-front direction.

[Rear-Side Recognition]

When the HMD is directed in the front direction, the user can visually recognize the front side through the display unit (see-through display) because no image is displayed on the display unit. When the HMD is directed in the non-front direction, a rear-side image captured by a provided camera is displayed on the display unit. The rear-side image may be a highlighted image of a moving object obtained by motion recognition or may be a thermographic image. In addition, each of these images may be displayed depending on a transition direction from the front direction to the non-front direction.

[Work Assistance]

When the HMD is directed in the front direction, the user can visually recognize the front side through the display unit (see-through display) because no image is displayed on the display unit. When the HMD is directed in the non-front direction, a work procedure (such as recipe) is displayed on the display unit. Because the work procedure is not displayed in a state where the HMD is directed in the front direction, a user's work is not prevented.

[Other]

A display range of a thesaurus (diagram where words are arranged based on their relationships) is moved depending on a direction of the HMD such that the user is allowed to easily search for related words. In addition, a display range of a star map is moved depending on a direction of the HMD such that the user is allowed to perform pseudo astronomic observation. Moreover, it is also possible to provide a game where the user inclines a virtual game plate depending on a direction of the HMD.

The present disclosure is not limited to the above respective embodiments but may be modified without departing from the sprit of the present disclosure.

Note that the present disclosure may also employ the following configurations.

(1)

A head-mounted display comprising:

a detector configured to detect a direction of at least one of the head-mounted display and a line of vision; and a display configured to display an output image of an application, wherein the application is selected based on the direction being outside a range of a front direction.

(2)

A head-mounted display according to (2), wherein the range of the front direction is set at least large enough to encompass the display when the head-mounted display is facing the front direction.

(3)

A head-mounted display according to (1) or (2), wherein the range of the front direction is set at least large enough to encompass a part of the display when the head-mounted display is facing the front direction.

(4)

A head-mounted display according to any one of (1) to (3), wherein the part of the display displays the output image of the application.

(5)

A head-mounted display according to any one of (1) to (4), wherein the front direction is set as a direction of the head-mounted display when the head-mounted display is powered on or when a predetermined input operation is performed.

(6)

A head-mounted display according to any one of (1) to (5), wherein the display is a see-through display.

(7)

A head-mounted display according to any one of (1) to (6), further comprising:

a processor; and a memory device storing instructions which when executed by the processor, causes the processor to select the application.

(8)

A head-mounted display according to any one of (1) to (7), wherein the detector is configured to detect the direction of the head-mounted display.

(9)

A head-mounted display according to any one of (1) to (8), wherein a first application is selected based on the direction being a first direction outside the range of the front direction, and a second application is selected based on the direction being a second direction outside the range of the front direction, and wherein the first application and second application are different.

(10)

A head-mounted display according to any one of (1) to (9), wherein the application is selected based on the direction and a timer value.

(11)

A head-mounted display according to any one of (1) to (10), wherein a first application is selected based on the direction moving from inside the range of the front direction to outside the range of the front direction, and the display is configured to display an output image of the first application.

(12)

A head-mounted display according to any one of (1) to (11), wherein a second application is selected or no application is selected based on the direction moving from outside the range of the front direction to inside the range of the front direction, and the display is configured to display an output image of the second application or to display no output image.

(13)

A head-mounted display according to any one of (1) to (12), wherein a selection of the first application is fixed based on a timer value and the direction moving from outside the range of the front direction to inside the range of the front direction, and the display is configured to continue to display the output image of the first application.

(14)

A head-mounted display according to any one of (1) to (13), wherein a fixation of the first application is released based on a timer value.

(15)
A head-mounted display according to any one of (1) to (14), wherein the application is selected based on an output of at least one of a GPS and an acceleration sensor included in the head-mounted display.
(16)
A head-mounted display according to any one of (1) to (15), wherein the output image of the application is at least one of text, a moving image, and a still image.
(17)
A head-mounted display according to any one of (1) to (16), wherein the display displays a plurality of applications in menu form.
(18)
A head-mounted display according to any one of (1) to (17), wherein the plurality of applications displayed in menu form are displayed in a sliding manner based on the direction detected by the detector.
(19)
A method of operating a head-mounted display comprising:
detecting a direction of at least one of the head-mounted display and a line of vision;
selecting an application based on the direction being outside a range of a front direction; and
displaying an output image of the application.
(20)
A non-transitory computer readable storage medium storing a computer program for causing a head-mounted display to:
detect a direction of at least one of the head-mounted display and a line of vision; select an application based on the direction being outside a range of a front direction; and display an output image of the application.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST 102 mounting member
103, 203 display unit
104 housing
121 earphone
141, 241 information management unit
142, 242 application selector
143, 243 detector
244 timer
100, 200 HMD

The invention claimed is:

1. A head-mounted display comprising:
a detector configured to detect a direction of at least one of the head-mounted display or a line of vision; and
a display configured to display a plurality of applications, wherein the plurality of applications are displayed side by side as output images when the direction is changed to a predetermined direction different from a front direction, and
wherein at least one of the applications is selected when the direction is consistent with the front direction.

2. The head-mounted display according to claim 1, wherein a range of the front direction is set at least large enough to encompass the display when the head-mounted display is facing the front direction.

3. The head-mounted display according to claim 1, wherein a range of the front direction is set at least large enough to encompass a part of the display when the head-mounted display is facing the front direction.

4. The head-mounted display according to claim 3, wherein the part of the display is configured to display the output images of the applications.

5. The head-mounted display according to claim 1, wherein the front direction is set as a direction of the head-mounted display when the head-mounted display is powered on or when a predetermined input operation is performed.

6. The head-mounted display according to claim 1, wherein the display is a see-through display.

7. The head-mounted display according to claim 1, further comprising:
a processor; and
a memory device storing instructions which when executed by the processor, causes the processor to select the application.

8. The head-mounted display according to claim 1, wherein the detector is configured to detect the direction of the head-mounted display.

9. The head-mounted display according to claim 1, wherein a first application is selected based on the direction being a first direction outside the range of the front direction, and a second application is selected based on the direction being a second direction outside the range of the front direction, and wherein the first application and second application are different.

10. The head-mounted display according to claim 1, wherein the at lease one of the applications is selected based on the direction and a timer value.

11. The head-mounted display according to claim 1, wherein
a first application is selected based on the direction moving from inside a range of the front direction to outside the range of the front direction, and the display is configured to display an output image of the first application.

12. The head-mounted display according to claim 11, wherein a second application is selected or no application is selected based on the direction moving from outside the range of the front direction to inside the range of the front direction, and the display is configured to display an output image of the second application or to display no output image.

13. The head-mounted display according to claim 11, wherein a selection of the first application is fixed based on a timer value and the direction moving from outside the range of the front direction to inside the range of the front direction, and the display is configured to continue to display the output image of the first application.

14. The head-mounted display according to claim 13, wherein a fixation of the first application is released based on a timer value.

15. The head-mounted display according to claim 1, wherein the at least one of the applications is selected based on an output of at least one of a GPS and an acceleration sensor included in the head-mounted display.

16. The head-mounted display according to claim 1, wherein the output images of the applications include at least one of text, a moving image, and a still image.

17. The head-mounted display according to claim 1, wherein the display is configured to display a plurality of applications in menu form.

18. The head-mounted display according to claim 17, wherein the plurality of applications displayed in menu form are displayed in a sliding manner based on the direction detected by the detector.

19. A method of operating a head-mounted display comprising:
   detecting a direction of at least one of the head-mounted display and a line of vision;
   displaying a plurality of applications side by side as output images when the direction is changed to a predetermined direction different from a front direction, and
   selecting at least one of the applications when the direction is consistent with the front direction.

20. A non-transitory computer readable storage medium storing a computer program for causing a head-mounted display to:
   detect a direction of at least one of the head-mounted display and a line of vision;
   display a plurality of applications side by side as output images when the direction is changed to a predetermined direction different from a front direction, and
   select at least one of the applications when the direction is consistent with the front direction.

* * * * *